(12) United States Patent
Hsu et al.

(10) Patent No.: US 12,273,328 B2
(45) Date of Patent: Apr. 8, 2025

(54) MESSAGE TRANSMITTING SYSTEM WITH HARDWARE SECURITY MODULE

(71) Applicant: InfoKeyVault Technology Co., Ltd., Taipei (TW)

(72) Inventors: Yuan Liou Hsu, New Taipei (TW); Tzu-Ang Kuo, Taipei (TW); Chihhung Lin, Taoyuan (TW)

(73) Assignee: INFOKEYVAULT TECHNOLOGY CO., LTD., Taipei (TW)

( * ) Notice: Subject to any disclaimer, the term of this patent is extended or adjusted under 35 U.S.C. 154(b) by 435 days.

(21) Appl. No.: 17/577,411

(22) Filed: Jan. 18, 2022

(65) Prior Publication Data
US 2022/0247729 A1 Aug. 4, 2022

(30) Foreign Application Priority Data
Jan. 29, 2021 (TW) ................. 110103418

(51) Int. Cl.
*H04L 9/40* (2022.01)
*H04L 9/08* (2006.01)
*H04L 9/32* (2006.01)

(52) U.S. Cl.
CPC ........ *H04L 63/0435* (2013.01); *H04L 9/0822* (2013.01); *H04L 9/0827* (2013.01); *H04L 9/0841* (2013.01); *H04L 9/0877* (2013.01); *H04L 9/0897* (2013.01); *H04L 9/3247* (2013.01)

(58) Field of Classification Search
None
See application file for complete search history.

(56) References Cited

U.S. PATENT DOCUMENTS

| 7,783,884 | B2 | 8/2010 | Nakano et al. | |
|---|---|---|---|---|
| 11,190,506 | B2 | 11/2021 | Bernsen et al. | |
| 2014/0171024 | A1* | 6/2014 | Huang | H04W 4/12 455/411 |
| 2015/0358158 | A1 | 12/2015 | Fadaie et al. | |

(Continued)

FOREIGN PATENT DOCUMENTS

| CA | 3127882 | 11/2020 |
|---|---|---|
| CN | 101807997 | 8/2012 |

(Continued)

OTHER PUBLICATIONS

Japan Intellectual Property Office, OA issued on Mar. 22, 2023.
(Continued)

*Primary Examiner* — William J. Goodchild
(74) *Attorney, Agent, or Firm* — WPAT, PC

(57) ABSTRACT

In a message transmitting system, a first user device installed therein a hardware security module and a second user device are in communication with a message exchange center. The first user device generates a first public-private key pair including a first private key only stored in the hardware security module, and a first public key sent to the message exchange center. The second user device establishes a shared key, uses the shared key to encrypt a message, and transmits the encrypted message to the first user device via the message exchange center. The hardware security module uses a specific information to derive the shared key, and uses the shared key to recover the message.

19 Claims, 8 Drawing Sheets

(56) References Cited

U.S. PATENT DOCUMENTS

2017/0201380 A1 7/2017 Schaap et al.
2018/0152454 A1* 5/2018 Kwon .................. H04L 63/045

FOREIGN PATENT DOCUMENTS

| | | |
|---|---|---|
| CN | 108400867 | 8/2018 |
| CN | 110677246 | 1/2020 |
| JP | 2003188866 | 7/2003 |
| JP | 2005092722 | 4/2005 |
| JP | 2007013439 | 1/2007 |
| JP | 2016139291 | 8/2016 |
| JP | 2017513265 | 5/2017 |
| JP | 2020202505 | 12/2020 |
| TW | 201902177 | 1/2019 |

OTHER PUBLICATIONS

Singapore Intellectual Property Office, OA issued on Aug. 31, 2023.
Taiwan Intellectual Property Office, OA issued on Apr. 7, 2022.

\* cited by examiner

MESSAGE TRANSMITTING SYSTEM WITH HARDWARE SECURITY MODULE

FIELD OF THE INVENTION

The present invention relates to a message transmitting system, and more particularly to a message transmitting system adapted to be used in a mobile communication network. The present invention also relates to a user device and a hardware security module used in the message transmitting system.

BACKGROUND OF THE INVENTION

With continuous development of mobile communication systems and significant enhancement of data transmission bandwidth, it is more and more popular for people to use a variety of instant messaging software to transmit voice conversations, text messages, image data, etc. Conventionally, transmission of all kinds of data by way of an instant messaging software is conducted via a message exchange center, and a backup copy of the transmitted data will be saved in a server of the software provider permanently or for at least a certain period of time.

Due to high requirement on data security nowadays, users are not satisfied with such conventional instant messaging software, which keeps private and secret data in the cloud. Consequently, secured instant messaging software such as Signal or Telegram is developed. Through such new instant messaging software, data are encrypted before transmission. Therefore, even if the data are intercepted on the way of transmission or stolen from the cloud, the encrypted data can still be secured from interpretation. Signal Messenger further announces that no text message and image data would be saved in its data server. In other words, the problem of keeping private and secret data in the cloud can be prevented.

So far, keys for encrypting data used in the above-mentioned secured instant messaging software are generated by central processing units (CPUs) of user devices. In general, a key is stored in a specific data storage zone in a user device, and managed by an operating system of the user device. Once the user device is hacked, a core of the user device, e.g.,i.e. the operating system, might be controlled. As a result, the hacker could get the key from the specific data storage zone of the user device and decrypt the encrypted data with the key. Loopholes in data security are thus caused.

SUMMARY OF THE INVENTION

Therefore, an object of the present invention is to provide a solution to improve data security for data transmission with instant messaging software.

An aspect of the present invention relates to a message transmitting system, comprising: a message exchange center; and at least a first user device and a second user device, which are in communication with the message exchange center. The first user device is installed therein a hardware security module, which generates a first key establishment combination including at least a first public-private key pair according to a key establishment algorithm. A first private key of the first public-private key pair is only stored in the hardware security module, and a first public key of the first public-private key pair is sent to the message exchange center. For transmitting a first message from the second user device to the first user device, the second user device obtains the first public key from the message exchange center, establishes a shared key, uses the shared key to encrypt a plaintext of the first message into a ciphertext of the first message, and transmits the ciphertext of the first message to the first user device via the message exchange center, and the first user device uses a specific information to derive the shared key, and uses the shared key to decrypt the ciphertext of the first message to recover the plaintext of the first message.

In another aspect, a message transmitting system comprises: a first user device in communication with an Internet, the first user device being installed therein a hardware security module, which generates a first key establishment combination including at least a first public-private key pair according to a key establishment algorithm, wherein a first private key of the first public-private key pair is only stored in the hardware security module; and a second user device in communication with the Internet. For transmitting a first message from the second user device to the first user device, the second user device provides an IP address for the first user device via the Internet to conduct an end-to-end connection between the first user device and the second user device, establishes a shared key, uses the shared key to encrypt a plaintext of the first message into a ciphertext of the first message, and transmits the ciphertext of the first message to the first user device via the end-to-end connection, and the first user device uses a specific information to derive the shared key, and uses the shared key to decrypt the ciphertext of the first message to recover the plaintext of the first message.

A further aspect of the present invention relates to a user device. The user device is adapted to communicate with another user device via a message exchange center by way of a specific application program, and comprises: a housing; a hardware security module disposed in the housing, generating a key establishment combination including at least a first public-private key pair according to a key establishment algorithm, and exclusively storing therein a first private key of the first public-private key pair; and a communication module disposed in the housing and being in communication with the hardware security module, actuated to send a first public key of the first public-private key pair to the message exchange center by the specific application program. When communicating with the another user device via the message exchange center, the user device uses a specific information to derive a shared key, and uses the shared key to process a message transmitted from the another user device by way of the specific application program.

In a further another aspect of the present invention, a hardware security module comprises a secure element and is adapted to be installed into a housing of a user device for generating a key establishment combination according to a key establishment algorithm when the user device is in communication with another user device via a message exchange center or via end-to-end connection. The key establishment combination includes at least a first public-private key pair, and a first private key of the first public-private key pair is exclusively stored in the hardware security module, and wherein the hardware security module uses a specific information to derive a shared key, and uses the shared key to process a message transmitted from the another user device to the user device by way of a specific application program.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
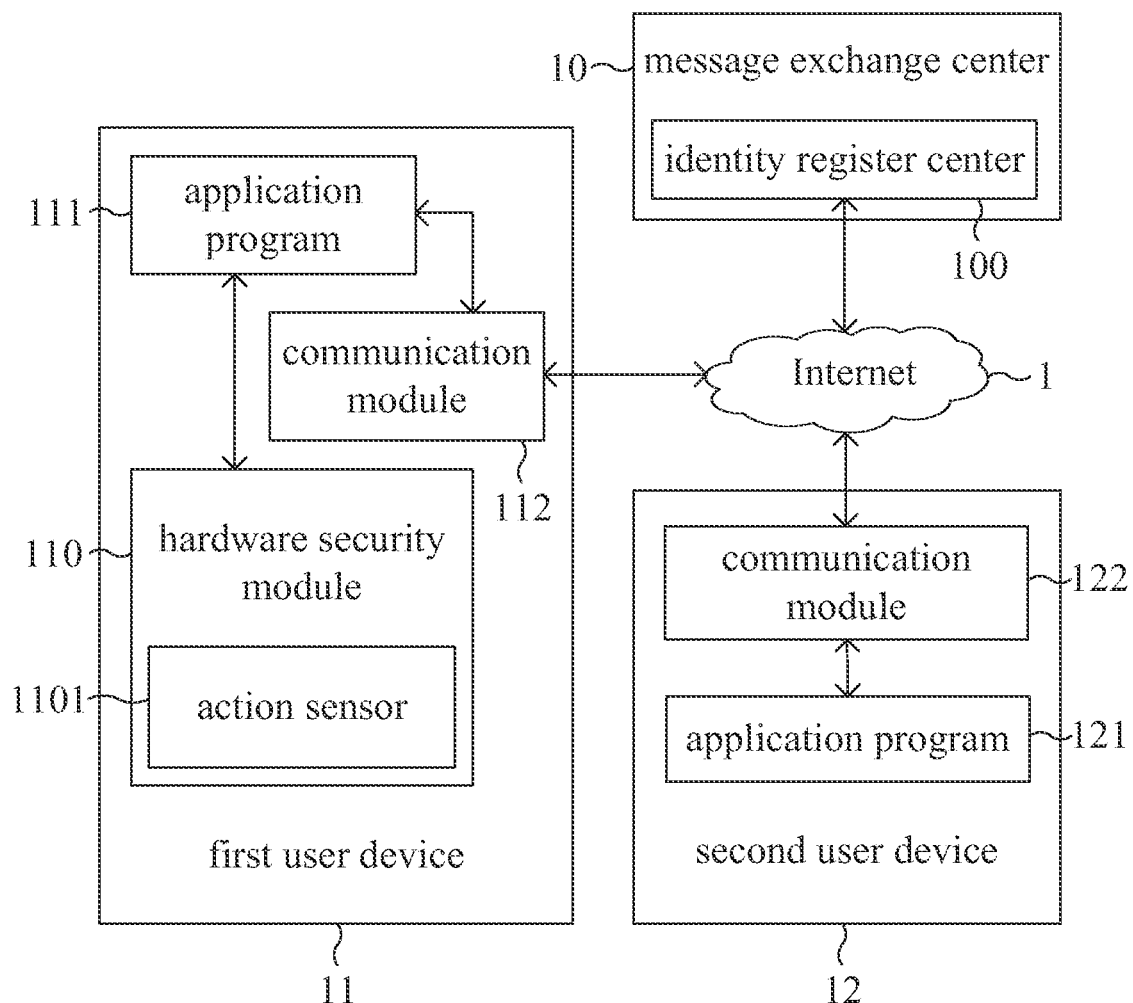
FIG. 1 is a functional block diagram of a message transmitting system according to an embodiment of the present invention.

Please refer to FIG. 1. A message transmitting system according to an embodiment of the present invention includes a message exchange center 10, a first user device 11 and a second user device 12. The first user device 11 is installed with a communication module 112 and the second user device 12 is installed with a communication module 122. The communication module 112 and the communication module 122, for example, may be implemented with those commonly used in smart phones or similar wireless communication devices. The first user device 11 and the second user device 12 are both communicable with the message exchange center 10 via, for example, Internet 1 as shown. The first user device 11, for example, may be a data processing device capable of executing application programs and processing communication data, such as smart phone, tablet computer or personal computer, and so may the second user device 12 be. Hereinafter, a smart phone operating therein an instant messaging software is taken as an example for illustrating the present invention.

Figure 2:
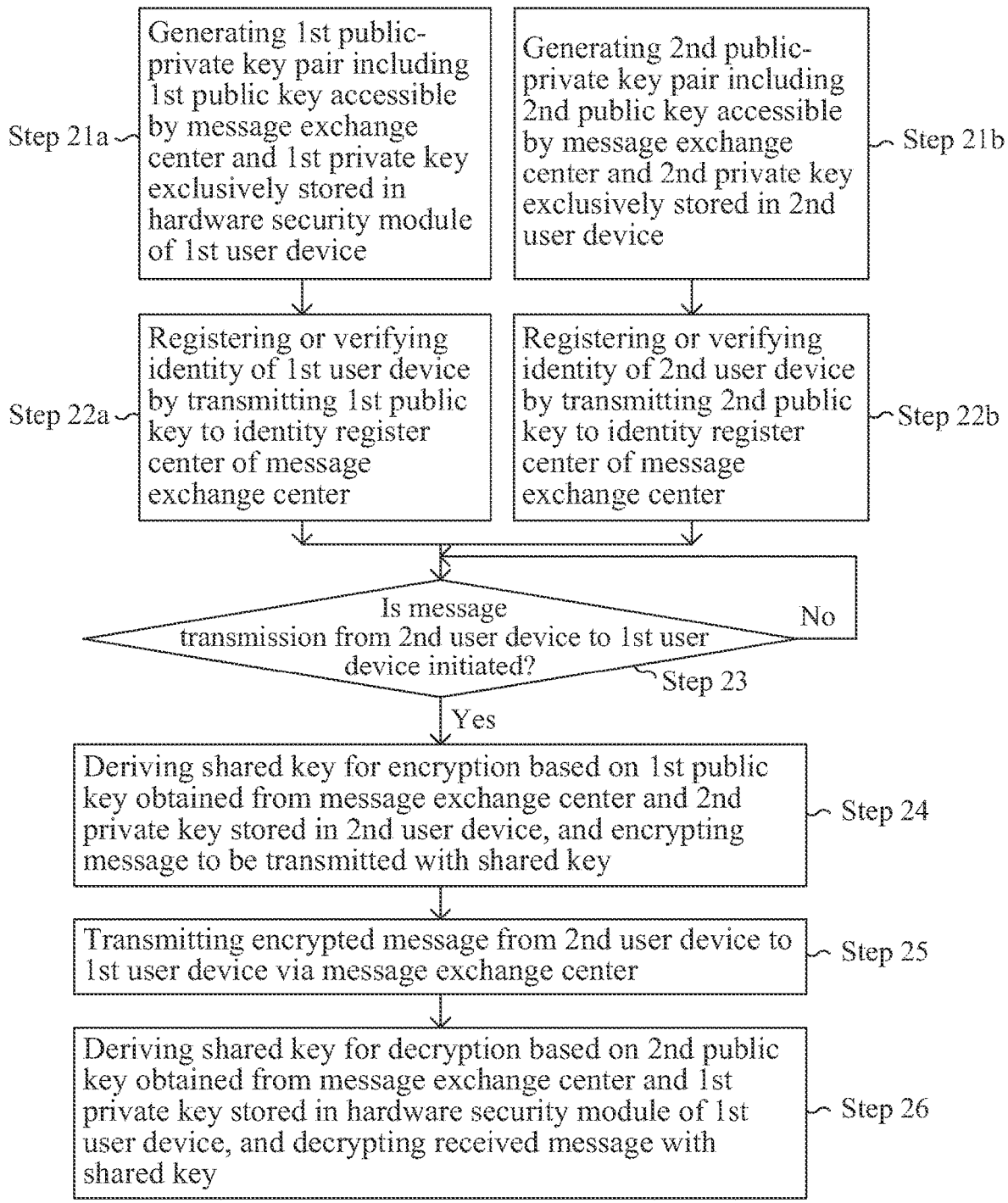
FIG. 2 is a flowchart schematically illustrating an encryption/decryption method of the message transmitting system shown in FIG. 1.

In this example, the first user device 11 is installed therein an application program 111 of a secured instant messaging software, e.g., Signal or Telegram. For effectively securing data, the first user device 11 is further installed therein a hardware security module 110, which is communicable with the application program 111 of the instant messaging software and the communication module 112, and, as generally understood by those skilled in the art, is a physical computing device that safeguards and manages digital keys, and performs encryption and decryption functions. The resulting message transmitting system executes an encrypt/decrypt process when message transmission is to be performed between the first user device 11 and the second user device 12, as illustrated in the flowchart of FIG. 2. In Step 21a, the hardware security module 110 generates a first key establishment combination according to a key establishment algorithm, e.g., key establishment algorithm on elliptic curve. The first key establishment combination includes at least a first public-private key pair USER_1-Keypair_1, which includes a first private key USER_1-Private_key_1 stored only in the hardware security module 110 other than any external device to be protected from illegal access. Furthermore, by setting the hardware security module 110 to be in a condition of restricted access by a core e.g., operating system, of the first user device 11, the keys stored in the hardware security module 110 and associated with the encrypted data could be further secured from being accessed.

The first public-private key pair USER_1-Keypair_1 further includes a first public key USER_1-Public_key_1, which is accessible by the message exchange center 10. In Step 22a, the first public key USER_1-Public_key_1 is transmitted to an identity register center 100 included in the message exchange center 10 and verification of user identity is conducted by the message exchange center 10 via a designated way. For example, the message exchange center 10 sends an SMS message containing an authentication code to the first user device 11, which is a smart phone and has a phone number having been registered in the message exchange center 10. In response, the first user device 11 enters and sends the authentication code back to the message exchange center 10 to complete the verification of user identity. The message exchange center 10, for example, may be a server of the instant messaging software. Likewise, a second user device 12 installed therein an application program 121 of the instant messaging software is in communication with the message exchange center 10. The application programs 111 and 121 and the message exchange center 10 are cooperatively associated with the instant messaging software and generally provided by the same program developer. Likewise, the second user device 12 executes Step 21b and Step 22b, which are similar to Step 21a and Step 22a, respectively, so as to generate a key establishment combination including at least a second public-private key pair USER_2-Keypair_1 consisting of a second public key USER_2-Public_key_1 and a second private key USER_2-Private_key_1. The second private key USER_2-Private_key_1 is stored only in the second user device, and the second public key USER_2-Public_key_1 is accessible by the message exchange center 10. The second public key USER_2-Public_key_1 can be transmitted to the identity register center 100 included in the message exchange center 10 for verification of user identity as described above. The second user device 12 may be installed therein a hardware security module (not shown), or the verification of user identity may be performed without a hardware security module.

When the second user device 12 is using the instant messaging software to transmit a message, e.g., text, emoticon, sticker, picture, voice or video, to the first user device 11 in Step 23, the second user device 12 obtains the first public key USER_1-Public_key_1 generated by the first user device 11 from the message exchange center 10, establishes a shared key according to the first public key USER_1-Public_key_1 and its own second private key USER_2-Private_key_1, uses the shared key to encrypt a plaintext of the message into a ciphertext (Step 24). Then, the second user device 12 transmits the ciphertext of the message to the message exchange center 10, and the message exchange center 10 further transmits the message in the ciphertext form to the first user device 11 (Step 25). The first user device 11, when receiving the ciphertext of the message, uses a specific information, which will be described later, to derive the shared key. In this embodiment, the shared key may be generated by, for example, Diffie-Hellman key exchange algorithm, or any other suitable algorithm. Depending on practical requirement, e.g., for minimizing burden of the system, the shared key derived when the second user device 12 communicates with the first user device 11 at the very first time may be used in subsequent communication up to a preset number of times or for a preset period of time. It is to be noted that the shared key illustrated in this embodiment is established according to one public key and one private key, but in practice, more than one public key and more than one private key can be collaboratively used for establishing the shared key. For example, the first key establishment combination includes more public-private key pairs than the first public-private key pair USER_1-Keypair_1, the second key establishment combination includes more public-private key pairs than the second public-private key pair USER_2-Keypair_1, and the shared key may be established according to the first public key USER_1-Public_key_1, the second private key USER_2-Private_key_1, and additional public and private keys selected from the first key establishment combination and the second key establishment combination.

Subsequently, when receiving the message in the ciphertext form in Step 26, the first user device 11 obtains the second public key USER_2-Public_key_1 generated by the second user device 12 from the message exchange center 10, uses at least the second public key USER_2-Public_key_1 as a specific information to cooperate with its own first private key USER_1-Private_key_1 to derive the shared key, and uses the shared key to recover the plaintext of the first message from the received ciphertext. The above-described operations performed in the first user device 11 is executed by the hardware security module 110 in this embodiment. In this way, the application program 111 of the first user device 11 and the application program 121 of the second user device 12 can cooperate with the message exchange center 10 to accomplish the message transmission in a secured way.

As mentioned above, the first private key USER_1-Private_key_1 is stored only in the hardware security module 110 of the first user device 11. In an embodiment according to the present invention, the hardware security module 110 would not release the first private key USER_1-Private_key_1 even for the first user device 11 unless the first user device 11 passes the verification of user identity. Only when the verification process is successfully accomplished, can the first private key USER_1-Private_key_1 be provided for the first user device to decrypt the message from the second user device 12 via the message exchange center 10. After the decryption of message is completed, the first private key USER_1-Private_key_1 may be deleted from the first user device 11 except the hardware security module 110. For minimizing security risks, the hardware security module 110 may periodically or conditionally update the first public-private pair. For example, the first public-private pair may be updated at a preset time interval or at a present data-amount interval. Alternatively, if the operational capability of the hardware security module 110 is high enough to do a large amount of computing, the decryption of the message may be executed by the hardware security module 110 itself without releasing the first private key USER_1-Private_key_1 out.

The verification process may be implemented with input of password or biometrics characteristic such as fingerprint. The verification process may include an initialization step, in which a password or a biometric characteristic for verification can be entered and set by the user while installing the application program 111 in the first user device 11 and binding the application program 111 to the hardware security module 110. Afterwards, input of the valid password or biometric characteristic is required for successfully logging in the instant messaging software by way of the application program 111. To prevent from remote attack by hackers, the verification process may further require the input of password and/or biometrics characteristic to be executed manually. If the inputted password and/or biometrics characteristic are consistent to the preset ones, it is determined that the first user device 11 passes the verification of user identity. Furthermore, whether a manual input is conducted or not can be determined by, for example, an action sensor 1101 included in the first user device 11. It is understood that a manual input of password and/or biometrics characteristic would result in vibration of the user device. If no vibration is detected by the action sensor 1101, it is determined that the input is not manually conducted, thus invalid. In an embodiment, the action sensor 1101 may be disposed in the hardware security module 110.

Refer back to Steps 24 and 26 of FIG. 2. In an embodiment, for deriving the shared key from at least the first public key USER_1-Public_key_1 and the second private key USER_2-Private_key_1 or from the second public key USER_2-Public_key_1 and the first private key USER_1-Private_key_1, a shared secret is first generated by way of key establishment. The shared key is then generated based on the shared secret and a key derivation function (KDF) commonly used in the art. It is understood that different key derivation functions would derive different shared keys with the same shared secret. It is preferable to frequently or periodically update the shared key to minimize the probability of being cracked.

Figure 3A:
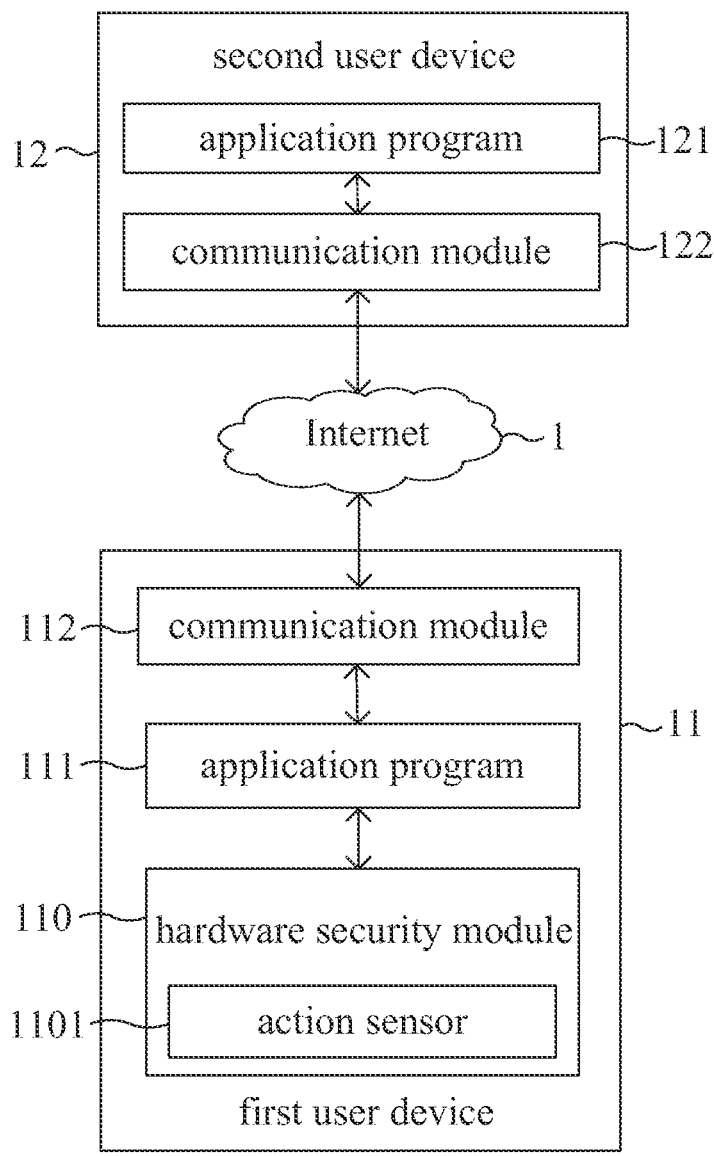
FIG. 3A is a functional block diagram of a message transmitting system according to another embodiment of the present invention.

Alternatively, the message transmitting system and its operating method according to the present invention may be used for end-to-end encryption/decryption, in which the message exchange center 10 shown in FIG. 1 can be omitted from the system, as illustrated in FIG. 3A. An embodiment of end-to-end encryption/decryption method executed when the second user device 12 is sending a message, e.g., a multimedia data including audio, video and/or text data, to the first user device 11 will be illustrated hereinafter with reference to the system of FIG. 3A and the flowchart of FIG. 3B.

Figure 3B:
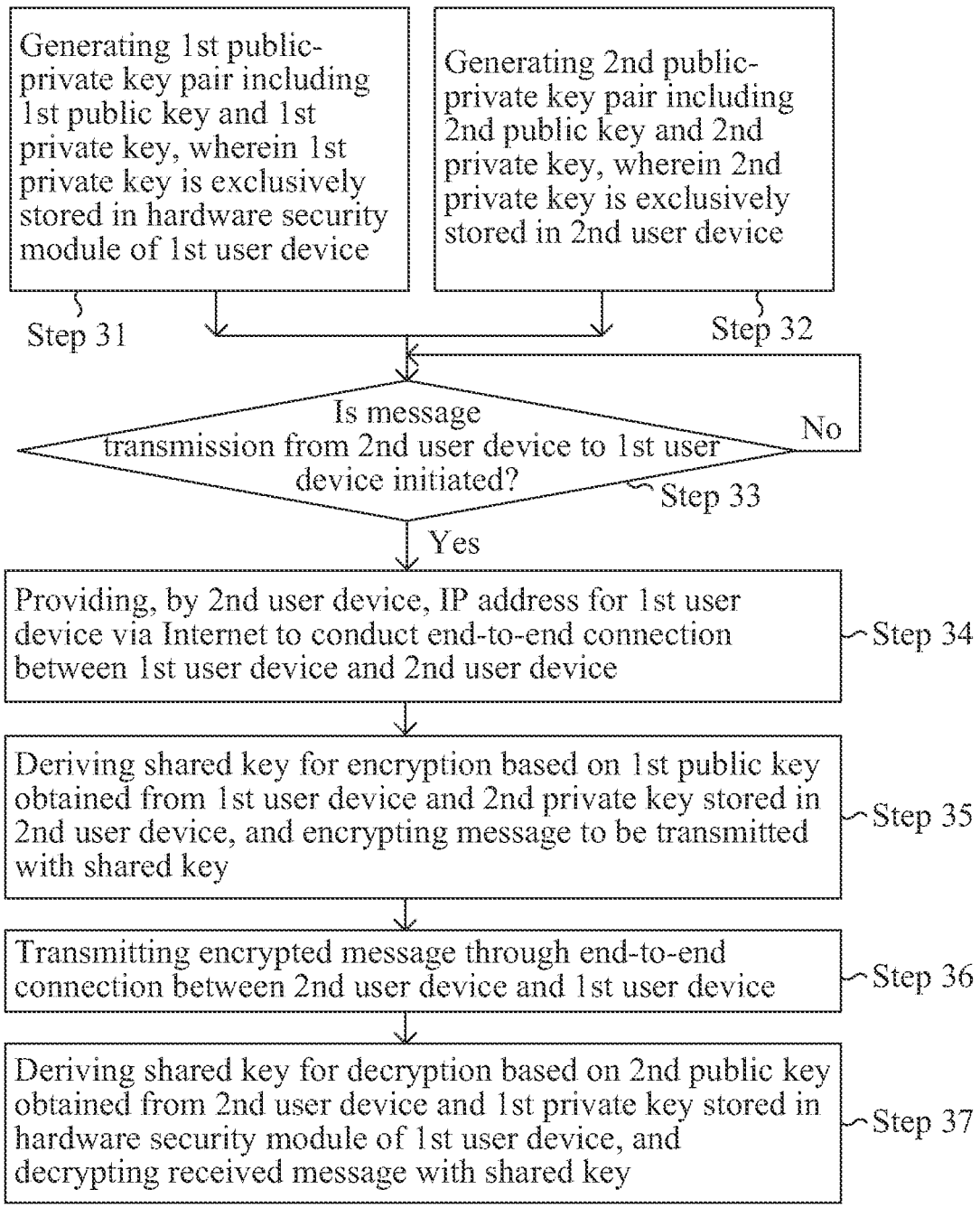
FIG. 3B is a flowchart schematically illustrating an encryption/decryption method of the message transmitting system shown in FIG. 3A.

Please refer to FIG. 3B. In Step 31, the hardware security module 110 of the first user device 11 generates a first key establishment combination according to a key establishment algorithm, e.g., key establishment algorithm on elliptic curve. The first key establishment combination includes at least a first public-private key pair USER_1-Keypair_1, which includes a first private key USER_1-Private_key_1 stored only in the hardware security module 110 other than any external device to be protected from illegal access. Furthermore, by setting the hardware security module 110 to be in a condition of restricted access by a core e.g., operating system, of the first user device 11, the keys stored in the hardware security module 110 and associated with the encrypted data could be further secured from being accessed. The first public-private key pair USER_1-Keypair_1 further includes a first public key USER_1-Public_key_1. Likewise, in Step 32, the second user device 12 connected to the first user device 11 generates a key establishment combination including at least a second public-private key pair USER_2-Keypair_1 consisting of a second public key USER_2-Public_key_1 and a second private key USER_2-Private_key_1. The second private key USER_2-Private_key_1 is stored only in the second user device. The second user device 12 may also be installed therein a hardware security module (not shown).

When the second user device 12 is using the instant messaging software to transmit a message, e.g., multimedia data, to the first user device 11 in Step 33, the second user device 12 provides an IP address for the first user device 11 via the Internet 1 to conduct an end-to-end connection between the first user device 11 and the second user device 12 (Step 34). Once the connection is set up, the hardware security module 110 of the first user device 11 obtains the second public key USER_2-Public_key_1 from the second user device 12 by way of the end-to-end connection, and establishes a shared key according to at least the second public key USER_2-Public_key_1 and its own first private key USER_1-Private_key_1. Meanwhile, the second user device 12 obtains the first public key USER_1-Public_key_1 from the first user device 11, and establishes a counterpart shared key according to the first public key USER_1-Public_key_1 and its own second private key USER_2-Private_key_1 (Step 35). The second user device 12 uses the shared key to encrypt a plaintext of the message into a ciphertext, and transmits the message in the ciphertext form to the first user device 11 (Step 36). Subsequently, when receiving the message in the ciphertext form, the first user device 11 uses a specific information, e.g., the second public key USER_2-Public_key_1 obtained from the second user device by way of end-to-end connection, and its own first private key USER_1-Private_key_1 to derive the shared key, and uses the shared key to recover the plaintext of the message from the received ciphertext (Step 37).

The shared key may be generated by, for example, Diffie-Hellman key exchange algorithm, or any other suitable algorithm. Depending on practical requirement, e.g., for minimizing burden of the system, the shared key derived when the second user device 12 communicates with the first user device 11 at the very first time may be used in subsequent communication up to a preset number of times or for a preset period of time.

In the above example, the shared key for decryption and the shared key for encryption are counterparts of the first and second public-private key pairs. Alternatively, it is also feasible that the shared key may be used for both encryption and decryption for saving resource of the system. For example, the hardware security module 110 uses the shared key to encrypt a plaintext of multimedia data to be sent from the first user device 11 to the second user device 12 into a ciphertext, and uses the same shared key to decrypt a ciphertext of multimedia data received by the first user device 11 from the second user device 12 into a plaintext. Likewise, the second user device 12 can generate a public-private key pair for communication with the first user device 11 and derives a shared key accordingly. The second user device 12 then uses the shared key to encrypt and decrypt the message transmitted to and from the first user device 11.

As described above, by way of end-to-end encryption/decryption via the Internet, message transmission can be performed by the application program 111 of the first user device 11 and the application program 121 of the second user device directly interconnected. Therefore, the message transmission security can be improved.

Figure 4A:
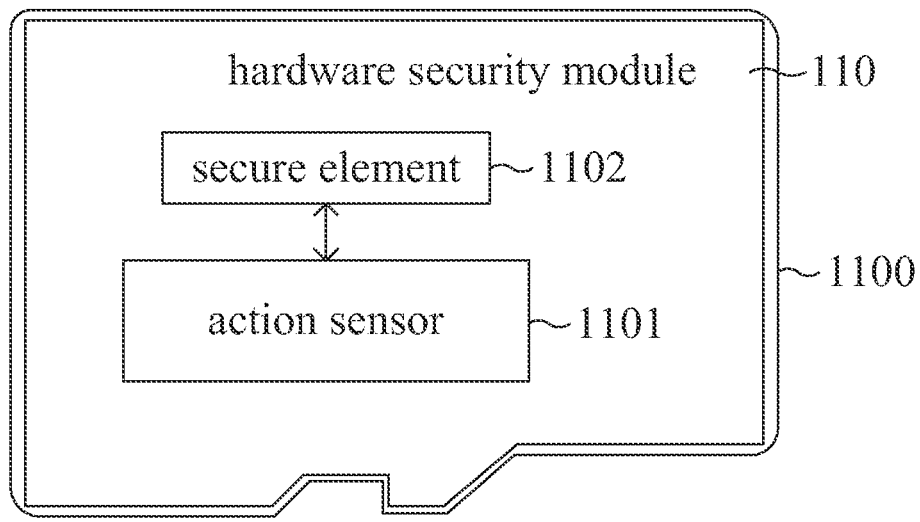
FIG. 4A is a schematic diagram illustrating a hardware security module according to an embodiment of the present invention.
Figure 4B:
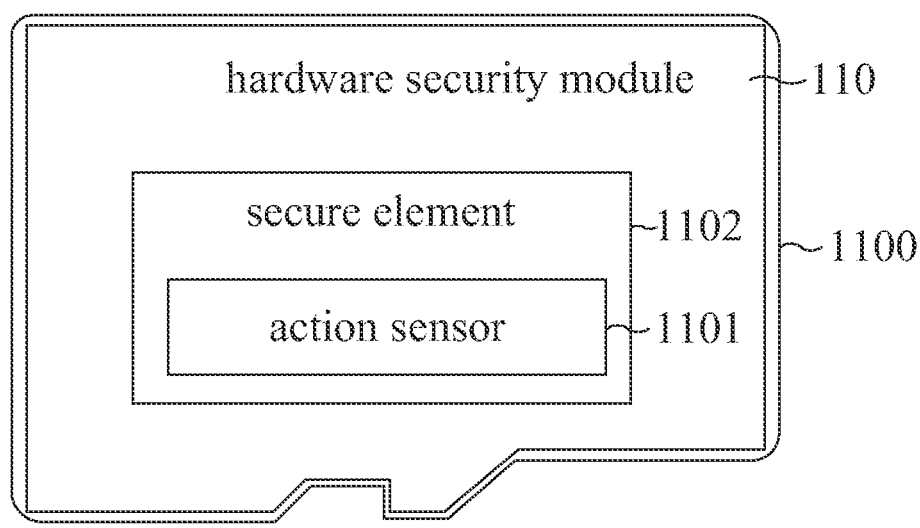
FIG. 4B is a schematic diagram illustrating a hardware security module according to another embodiment of the present invention.

FIG. 4A and FIG. 4B illustrate two examples of the hardware security module 110 adapted to be used in a system according to the present invention. In the example shown in FIG. 4A, the hardware security module 110 is implemented with an external memory card such as a secure digital memory card, and includes the above-described action sensor 1101 and a secure element 1102, which are accommodated in a housing 100. The specification of the secure digital memory card may vary with practical applications. For example, it may be of a standard size (32.0*24.0*2.1 mm), a mini size (21.5*20.0*1.4 mm), or a micro size (15.0*11.0*1.0 mm), and the micro-size secure digital memory card is particularly popular for currently commercially available smart phones. In addition to a secure digital memory card, the hardware security module 110 may alternatively be any other suitable form of external memory card, e.g., memory stick. The example of hardware security module 110 shown in FIG. 4B is similar to that shown in FIG. 4A except that the action sensor 1101 is integrated in the secure element 110.

It is understood from the above descriptions that the hardware security module 110 adapted to be used in a system according to the present invention is characterized in generating and storing a key establishment combination including one or more public-private key pairs based on a key establishment algorithm; using the key establishment combination stored therein to conduct key establishment so as to generate and store a shared secret; using the shared secret stored therein to derive and store a shared key; using the shared key stored therein to encrypt a plaintext of a message into a ciphertext or decrypt a ciphertext of a message into a plaintext; and conditionally exporting the shared secret or shared key after a verification process. The above-mentioned plaintext of a message, for example, can be a variety of digital data such as text file, image file, audio file or multimedia file combining two or more kinds of the above files. The key establishment combination, the shared secret and the shared key are stored in a hardware manner instead of a software manner.

The above-described operations of generating public-private pair(s) and verifying identity can be executed by the secure element 1102 of the hardware security module 110. For performing the operations, the secure element 1102 is required to be built therein a cryptographic algorithm, be tamper resistant, be installed with secure OS, be equipped with a sensor to notify intrusive or non-intrusive attack, and have a secured storage space for cryptographic keys. It is to be noted that in the hardware security module 110 illustrated in FIG. 4A, the action sensor 1101 and the secure element 1102 are separate elements, so the secure element 1102 can be implemented with a common one. On the contrary, in the hardware security module 110 illustrated in FIG. 4B, the action sensor 1101 is integrated in the secure element 1102, so a special specification of secure element is required to be used as the secure element 1102. Nevertheless, the special specification of the secure element 1102 reduces the possibility of remote control by a hacker. Furthermore, the action sensor 1101 can work reliably.

Figure 5:
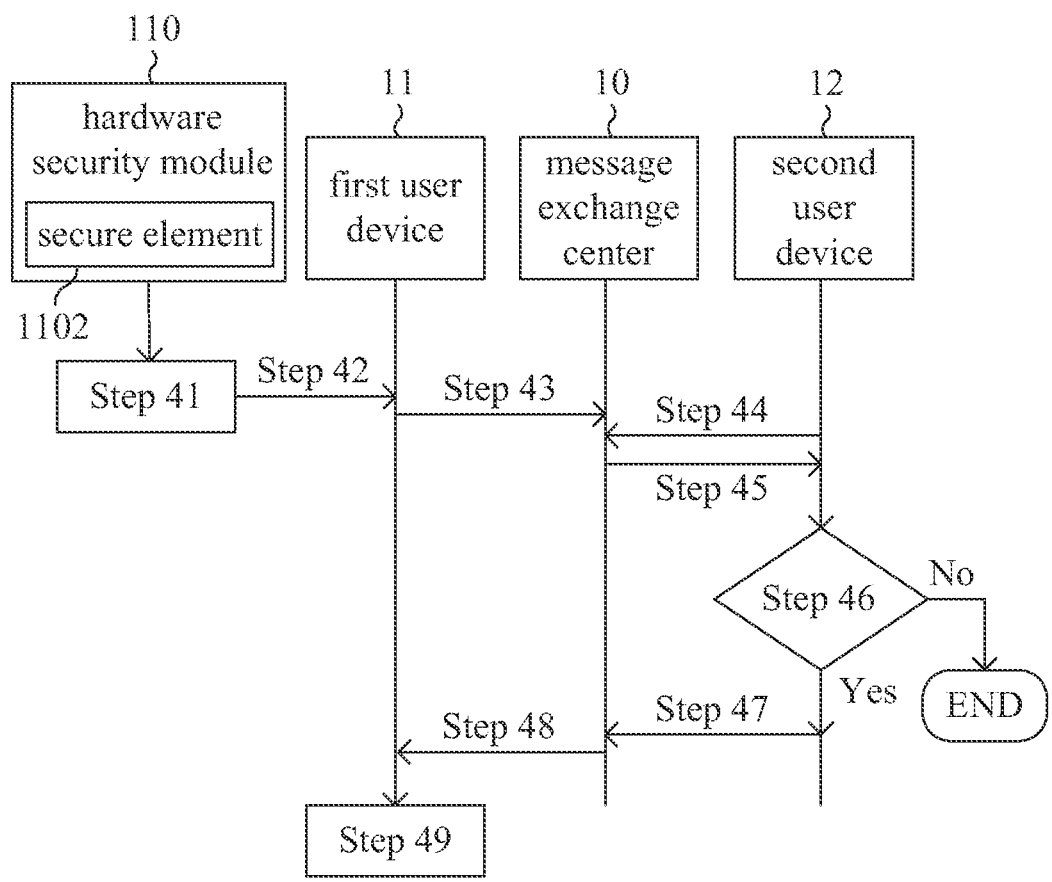
FIG. 5 is a flowchart schematically illustrating an encryption/decryption method of a message transmitting system according to a further embodiment of the present invention.

With the hardware security module 110 including the secure element 1102, the data-securing capability of the message transmitting system can be further enhanced. FIG. 5 schematically illustrates a message transmitting system and its operational principle according to a further embodiment of the present invention. Compared with the system illustrated in FIG. 1, the system illustrated in FIG. 5 is safer from crack. First of all, the secure element 1102 generates a key establishment combination including at least a third public-private key pair consisting of a third public key and a third private key, and a fourth public-private key pair consisting of a fourth public key and a fourth private key. In addition, the secure element 1102 randomly generates a main key to encrypt the third private key (Step 41). Alternatively, the main key may be generated by another way instead of being randomly generated. For example, the main key may be a constant value stored in the secure element 1102, or it may be derived with a key derivation function in response to a character string inputted by a user. The main key is exclusively stored in the secure element 1102. For saving storage space of the secure element 1102, the third private key encrypted with the main key may be stored in an external source outside the secure element 1102, and deleted from the secure element 1102. Afterwards, when the third private key is required by the system for deriving a shared secret or shared key, the secure element 1102 retrieves the encrypted third private key from the external source and recovers the encrypted third private key into the third private key with the main key stored therein. Then a shared secret or shared key can be derived by way of a key establishment algorithm, e.g., Diffie-Hellman key exchange algorithm, based on the recovered third private key and a public key of the second user device 12.

It is to be noted that since a shared secret or shared key is derived in a device based on its own private key and a public key of a counterpart, it is important to confirm the authenticity of a received public key so as to prevent from man-in-the-middle attack. Therefore, according to the present invention, a digital signature is introduced to avoid the risk. For example, after the first user device 11 completes the registration of identity as illustrated in Steps 22a and 22b of the flowchart shown in FIG. 2, a digital signature can be generated at this time with one of the private keys of the first user device 11. The matter to be signed for is a specific information that is known to both the first user device 11 and the second user device 12. For example, the information may be a public key or any other public information about the first user device 11. The above-mentioned digital signature may be implemented with currently available techniques, e.g., the one used in the secured instant messaging software "Signal". The above-described key establishment process conducted with the private key of the second user device and the public key of the first user device cannot be executed until the digital signature is successfully verified.

Therefore, following Step 41 of the flowchart shown in FIG. 5, if the third private key is used for generating a first digital signature, the third public key, the third private key encrypted with the main key, and the first digital signature are transmitted outside the secure element 1102 and stored in another storage space of the first user device 11 (Step 42). Optionally, the copies of the third public key, the third private key encrypted with the main key, and the first digital signature can be deleted from the secure element 1102 for saving storage space, while the main key is still stored in the secure element 1102.

Afterwards, the first user device 11 transmits the third public key and the first digital signature to the message exchange center 10 (Step 43) in response to a message-sending action conducted by the second user device 12 and directed to the first user device 11 (Step 44). Then the message exchange center 10 transmits the third public key and the first digital signature to the second user device 12 (Step 45) so that the second user device 12 can verify the first user device 11 by verifying the first digital signature according to the third public key and the first digital signature (Step 46).

Once the first user device 11 successfully passes the verification, the second user device 12 uses a key combination including at least the third public key of the first user device 11 and its own private key to conduct key establishment so as to generate a shared key, uses the shared key to encrypt the message to be sent to the first user device 11, and transmits the encrypted message to the message exchange center 10 (Step 47). The message exchange center 10 then transfers the encrypted message to the first user device 11 (Step 48). The first user device 11, after receiving the encrypted message, obtains the public key of the second user device 12. Meanwhile, the encrypted third private key, which is stored in the secure element 1102 or transmitted from the external storage space back to the secure element 1102, is decrypted with the main key to recover the third private key. The secure element 1102 uses the public key of the second user device 12 and the third private key for key exchange and key establishment to derive the shared key. With the shared key, the message can be decrypted to recover the plaintext from the ciphertext(Step 49). In this way, the message can be secured from man-in-the-middle attack while being sent from the second user device 12 to the first user device 11.

In the above embodiments, the first user device 11 including the hardware security device 110 is used for illustrating securing means of the present invention. Of course, the second user device 12 may also include a similar hardware security device or installed with a software performing similar functions to conduct the securing operations. Furthermore, verification of the digital signature of the second user device may be additionally requested by the first user device 11 before message transmission. That is, the second user device 12 transmits its public key and digital signal to the first user device 11 via the message exchange center 10 for digital signal verification and identity verification. The verification of the digital signature of the second user device may be executed anytime before Step 49. If the verification fails, the first user device 11, even if receiving the encrypted message, will not decrypt the message. Although the verification of digital signature for further security is described with reference to the embodiment of FIG. 5, it can also be used in any other embodiment described above.

Preferably but not necessarily, the secure element 1102 of the hardware security device 110 may execute identity verification of the first user device 11 before being actuated to perform any requested operation such as generating the key establishment combination or recovering the message and the digital signature. The identity verification is executed by the secure element 1102 and, for example, may be implemented with manual input of a password and/or detection of biometrics. The identity verification may include vibration detection executed by the action sensor mentioned above. Furthermore, for reducing risk of unduly use of message, it is preferable that the message exchange center 10 deletes the encrypted message stored therein upon receiving a confirmation signal from the first user device 11 to notify successful receiving of the encrypted message.

Figure 6A:
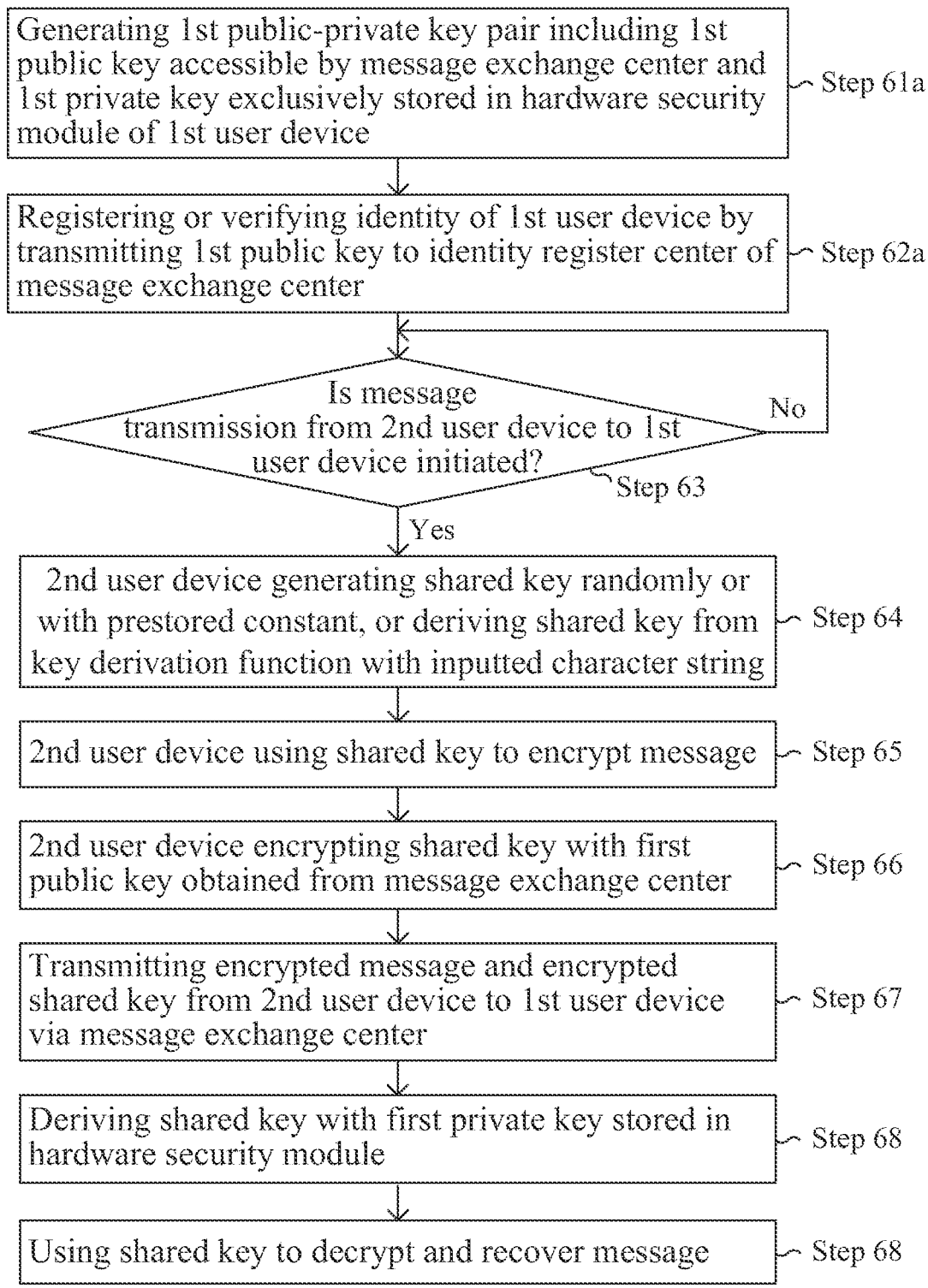
FIG. 6A is a flowchart schematically illustrating another encryption/decryption method of the message transmitting system shown in FIG. 1.

FIG. 6A is a flowchart schematically illustrating another encryption/decryption method of the message transmitting system shown in FIG. 1. The encryption/decryption method in this embodiment is similar to that as illustrated in FIG. 2 except the establishment of the shared key by the second user device, and the derivation of the shared key by the first user device. In this embodiment, after Steps 61-63 respectively similar to Steps 21a, 22a and 23 illustrated in the flowchart of FIG. 2, the shared key is established in one of the following ways (Step 64): the shared key is generated by the second user device randomly; the shared key is implemented with a constant that is stored in the second user device; or the shared key is derived from a key derivation function with a character string that is inputted to the second user device by a user. The shared key is used by the second user device to encrypt the message (Step 65). Furthermore, in Step 66, the second user device encrypts the shared key with the first public key obtained from the message exchange center. Subsequently, the encrypted message and encrypted shared key are transmitted from the second user device to the first user device via the message exchange center (Step 67), and the shared key is derived from the encrypted shared key with a specific information, e.g., the first private key stored in the hardware security module (Step 68), and used for decrypting the encrypted message to recover the message (Step 69).

Figure 6B:
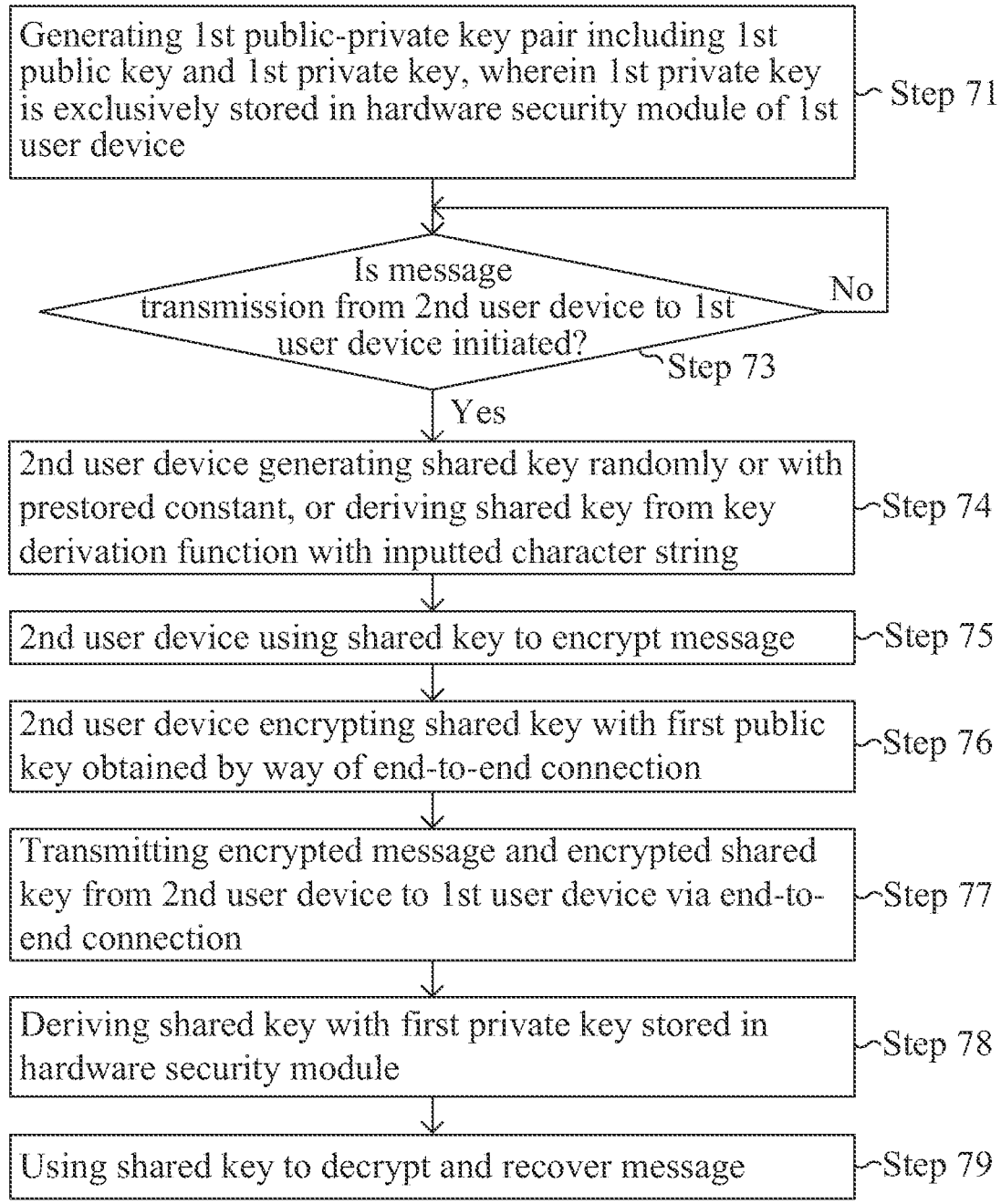
FIG. 6B is a flowchart schematically illustrating a further encryption/decryption method of the message transmitting system shown in FIG. 1.

FIG. 6B is a flowchart schematically illustrating a further encryption/decryption method of the message transmitting system shown in FIG. 1. The encryption/decryption method in this embodiment is similar to that as illustrated in FIG. 3B except the establishment of the shared key by the second user device, and the derivation of the shared key by the first user device. In this embodiment, after Steps 71 and 73 similar to Steps 31 and 33 illustrated in the flowchart of FIG. 3B, the shared key is established in one of the following ways (Step 74): the shared key is generated by the second user device randomly; the shared key is implemented with a constant that is stored in the second user device; or the shared key is derived from a key derivation function with a character string that is inputted to the second user device by a user. The second user device uses the shared key to encrypt the message (Step 75). Furthermore, in Step 76, the second user device encrypts the shared key with the first public key obtained from the first user device by way of the end-to-end connection. Subsequently, the encrypted message and encrypted shared key are transmitted from the second user device to the first user device via the end-to-end connection (Step 77), and the shared key is derived from the encrypted shared key with a specific information, e.g., the first private key stored in the hardware security module (Step 78), and used for decrypting the encrypted message to recover the message (Step 79).

It is to be noted that for improving information security of a currently available instant messaging software executed in a user device by installing a hardware security module according to the present invention in the user device, the instant messaging software needs to be properly modified to work with the hardware security module. For example, for the instant messaging software "Signal", which is an open-source software, the source code can be directly edited and complied to comply with the protocol of the present system. The modified application program may be previously installed in the user device in the factory, or it can be available for remote download. Alternatively, the modified application program may be stored in the hardware security module and installed into the user device after the hardware security module is inserted into the user device.

In the above embodiments, the hardware security device may be implemented with a secure digital memory card, which can be readily inserted into the user device, e.g., a smart phone. In addition to instant messaging software, a hardware security module according to the present invention may also be used in other communication systems, e.g., email or online conference systems, to secure message transmission. Since the essential keys are well protected inside the hardware security device and strictly limited from access, the message transmission in the communication system can be effectively secured.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A message transmitting system, comprising:
a message exchange center;
at least a first user device and a second user device, which are both in communication with the message exchange center via a network for message exchange; and
a hardware security module, which is a secure digital memory card adapted to be inserted into the first user device,
wherein after the hardware security module is inserted into the first user device, the hardware security module generates a first key establishment combination including at least a first public-private key pair according to a key establishment algorithm, wherein a first private key of the first public-private key pair is only stored in the hardware security module, and a first public key of the first public-private key pair is sent to the message exchange center; and
wherein for transmitting a first message from the second user device to the first user device, the second user device obtains the first public key from the message exchange center, establishes or encrypts a shared key with the first public key, uses the shared key to encrypt a plaintext of the first message into a ciphertext of the first message, and transmits the ciphertext of the first message to the first user device via the message exchange center, wherein the first user device obtains the encrypted shared key from the second user device, uses a specific information, which includes the first private key stored in the hardware security module, to derive the shared key, and uses the shared key to decrypt the ciphertext of the first message to recover the plaintext of the first message.

2. The system according to claim 1, wherein the second user device generates a second key establishment combination including at least a second public-private key pair according to the key establishment algorithm, wherein a second private key of the second public-private key pair is only stored in the second user device, and a second public key of the second public-private key pair is sent to the message exchange center, and the shared key is established by the second user device according to at least the first public key and the second private key.

3. The system according to claim 2, wherein the specific information is the second public key obtained from the message exchange center, and the hardware security module uses the second public key and the first private key to perform key establishment, thereby deriving the shared key.

4. The system according to claim 2, wherein the message exchange center includes an identity register center, which receives the first public key and the second public key for identity verification of the first user device and the second user device, respectively.

5. The system according to claim 4, wherein after being successfully verified, the first user device generates a digital signature with the first private key of the first user device, and the second user device receives the digital signature via the message exchange center, verifies the first user device by verifying the digital signature based on the first public key of the first user device, and derives the shared key from a shared secret, which is generated according to at least the first public key and the second private key, after successfully verifying the digital signature.

6. The system according to claim 1, wherein the shared key is established in a way that:
the shared key is generated by the second user device randomly;
the shared key is implemented with a constant that is stored in the second user device; or
the shared key is derived from a key derivation function with a character string that is inputted to the second user device by a user.

7. The system according to claim 6, wherein the shared key is further encrypted by the second user device according to the first public key obtained from the message exchange center and then transmitted to the first user device via the message exchange center.

8. The system according to claim 7, wherein the specific information is the first private key stored in the hardware security module, and the first user device uses the first private key to decrypt the encrypted shared key so as to derive the shared key.

9. The system according to claim 1, wherein the hardware security module executes identity verification of the first user device, and does not generate the first key establishment combination and/or recover the shared key until the first user device is successfully verified.

10. The system according to claim 9, wherein the first user device further includes an action sensor disposed in the hardware security module for detecting vibration of the first user device, and the identity verification is determined to fail if no vibration is detected by the action sensor.

11. The system according to claim 1, wherein the hardware security module includes a secure element randomly generating and exclusively storing a main key, which is used to encrypt and recover the first private key.

12. The system according to claim 1, wherein the hardware security module includes a secure element generating and exclusively storing a main key, which is a constant value used to encrypt and recover the first private key.

13. The system according to claim 1, wherein the hardware security module includes a secure element generating and exclusively storing a main key, which is derived with a key derivation function in response to a character string inputted by a user.

14. A message transmitting system, comprising:
a first user device in communication with an Internet;
a hardware security module, which is a secure digital memory card, adapted to be inserted into the first user device, and generating a first key establishment combination including at least a first public-private key pair according to a key establishment algorithm after the hardware security module is inserted into the first user device, wherein a first private key of the first public-private key pair is only stored in the hardware security module; and
a second user device in communication with the Internet, wherein for transmitting a first message from the second user device to the first user device, the second user device provides an IP address for the first user device via the Internet to conduct an end-to-end connection between the first user device and the second user device, obtains the first public key from the first user device, establishes or encrypts a shared key with the first public key, uses the shared key to encrypt a plaintext of the first message into a ciphertext of the first message, and transmits the ciphertext of the first message to the first user device via the end-to-end connection, and the first user device obtains the encrypted shared key from the second user device, uses a specific information, which includes the first private key stored in the hardware security module, to derive the shared key, and uses the shared key to decrypt the ciphertext of the first message to recover the plaintext of the first message.

15. The system according to claim 14, wherein the second user device generates a second key establishment combination including at least a second public-private key pair according to the key establishment algorithm, wherein a second private key of the second public-private key pair is only stored in the second user device, and the shared key is established according to at least the first public key and the second private key.

16. The system according to claim 15, wherein the specific information is the second public key obtained from the second user device by way of the end-to-end connection, and the hardware security module uses the second public key and the first private key to perform key establishment, thereby deriving the shared key.

17. The system according to claim 14, wherein the shared key is established in a way that:
the shared key is generated by the second user device randomly;
the shared key is implemented with a constant that is stored in the second user device; or
the shared key is derived from a key derivation function with a character string that is inputted to the second user device by a user.

18. The system according to claim 17, wherein the shared key is further encrypted by the second user device according to the first public key obtained from the first user device and then transmitted to the first user device by way of the end-to-end connection.

19. The system according to claim 18, wherein the specific information is the first private key stored in the hardware security module, and the first user device uses the first private key to decrypt the encrypted shared key so as to derive the shared key.

* * * * *